(No Model.) 2 Sheets—Sheet 1.

J. A. MOSHER.
PHOTOGRAPHIC CAMERA.

No. 598,804. Patented Feb. 8, 1898.

Witnesses
W. C. Coolies
C. H. Crawford

Inventor
John A. Mosher
By Louis N. Gibson
Attorney (No Model.) 2 Sheets—Sheet 2.
J. A. MOSHER.
PHOTOGRAPHIC CAMERA.
No. 598,804. Patented Feb. 8, 1898.
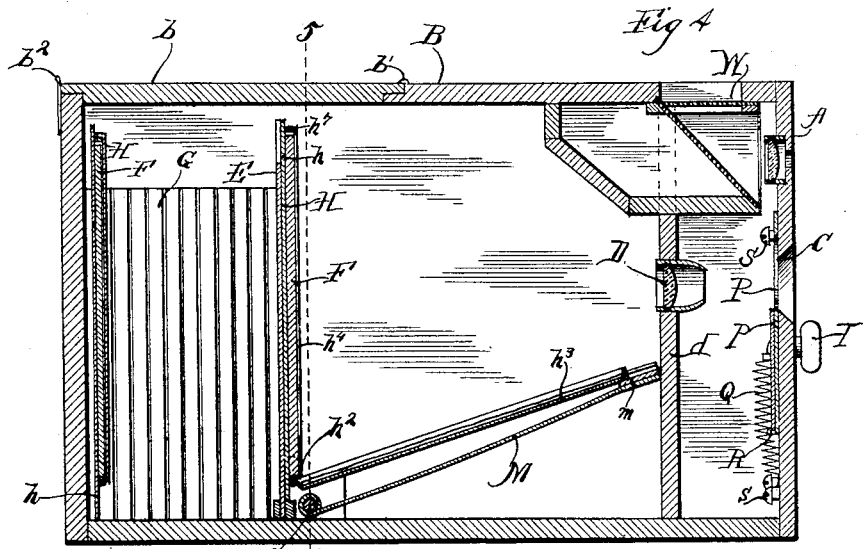
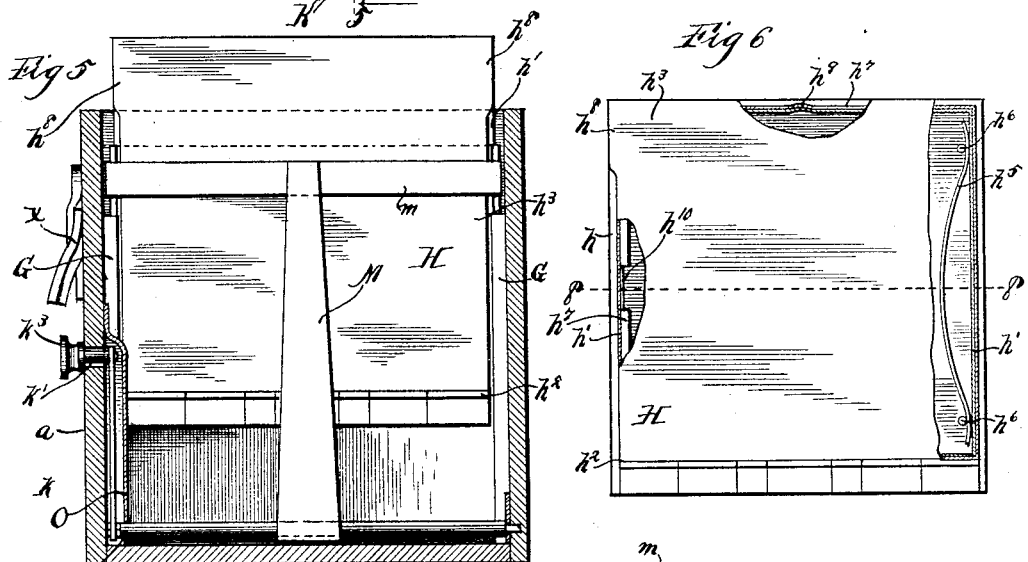
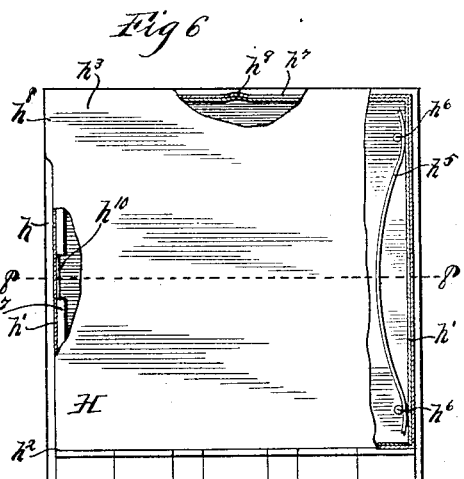
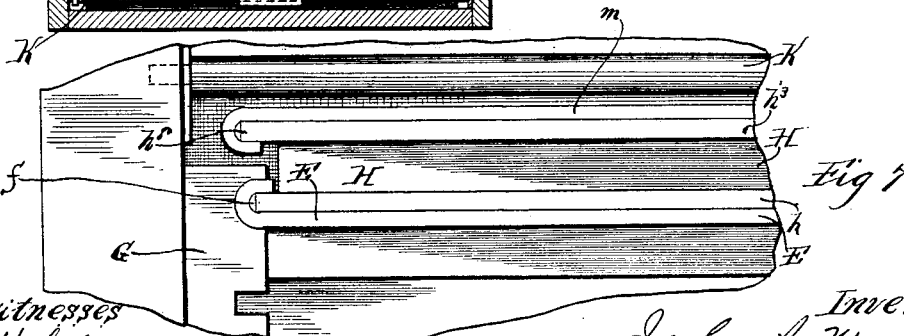
Witnesses
W. C. Coolies
C. A. Crawford
Inventor
John A. Mosher
By Louis K. Gillson
Attorney

UNITED STATES PATENT OFFICE.

JOHN A. MOSHER, OF CHICAGO, ILLINOIS, ASSIGNOR TO THE ADAMS & WESTLAKE COMPANY, OF ILLINOIS.

PHOTOGRAPHIC CAMERA.

SPECIFICATION forming part of Letters Patent No. 598,804, dated February 8, 1898.

Application filed August 17, 1896. Serial No. 602,986. (No model.)

*To all whom it may concern:*

Be it known that I, JOHN A. MOSHER, a citizen of the United States, residing at Chicago, in the county of Cook and State of Illinois, have invented certain new and useful Improvements in Photographic Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to portable magazine-cameras, and has for its several objects the provision of means for inclosing the plates within light-proof holders, so that they may be manipulated without injury, for opening and closing the plate-holder while within the camera without exposing the interior of the case to the light, for conveniently storing a quantity of plate-holders within the case of the camera, and for regulating the exposure of the plate. These objects are attained by inclosing each plate within a metallic holder in box form and having a hinged lid, by locating across the interior of the case or box a partition provided with means for holding one of the plate-holders in position, by pivoting within the case a swinging arm having clamping-fingers adapted to seize the cover of the plate-holder in order that it may be opened, means being provided for manipulating this lever from without the camera, and by various other parts and arrangement of parts, as hereinafter fully specified.

Figure 1:
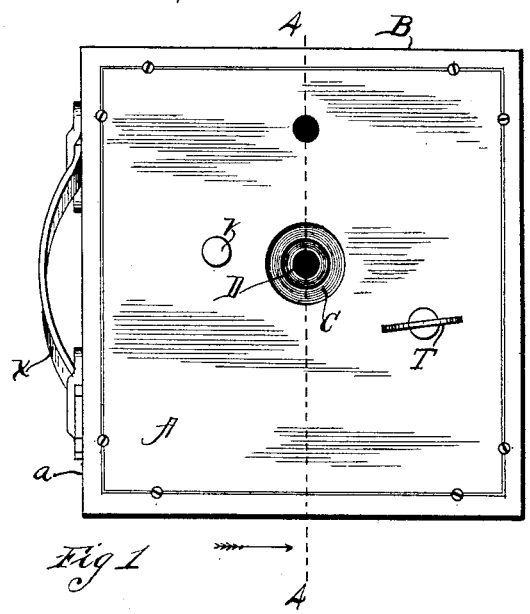
Figure 2:
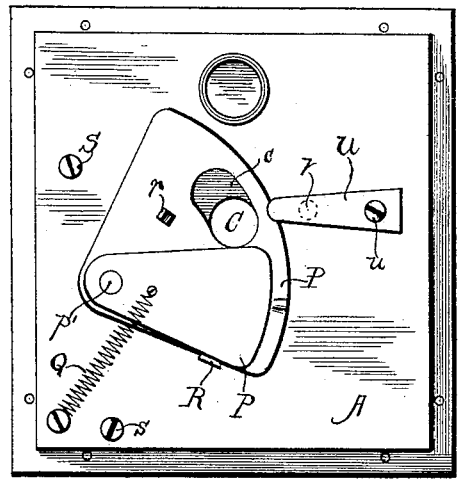
Figure 3:
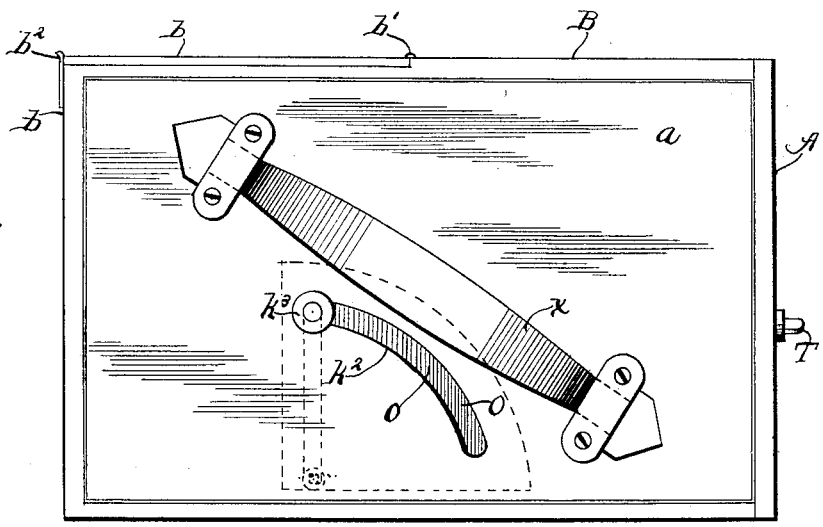
Figure 8:

In the drawings, Figure 1 is a front elevation of the camera. Fig. 2 is an elevation of the inner face of the front of the camera. Fig. 3 is a side elevation. Fig. 4 is a central longitudinal vertical section on the line 4 4 of Fig. 1. Fig. 5 is a transverse section on the line 5 5 of Fig. 4, showing, however, the parts in somewhat different position. Fig. 6 is a front elevation of the plate-holder partly broken away. Fig. 7 is an enlarged detail plan section of the case, showing a plan of the supporting-partition and a plate-holder engaged thereby; and Fig. 8 is a sectional view of the plate-holder on the line 8 8 of Fig. 6.

The case of the camera is an oblong rectangular box, the front of which is shown at A, its top being shown at B, and one of its side walls at $a$. The rearward portion $b$, approximately one-half of the cover B, is openable and is hinged to the forward portion, as indicated at $b'$, the joint between these two sections being rabbeted for the better exclusion of light, and is fastened shut by means of a simple spring-clasp $b^2$, secured to the back of the case. The front A is provided with an exposing-aperture C, which is controlled by a shutter which will be hereinafter described, and the lens D is mounted back of this aperture within an aperture in a transverse partition $d$.

A fixed partition E is located across the interior of the case, slightly back of the focal plane, dividing the case into two chambers, the rearward one of which serves as the magazine within which the plate-holders are stored. The plate F is exposed in front of the partition E and without being removed from its holder, the latter being held by the partition E and its hinged front being thrown open, so that the light entering through the lens D will strike the plate.

The holder consists of a sheet-metal case or box H, adapted to receive the plate. The back $h$ of the holder is prolonged in each direction beyond the side walls $h'$, so as to form flanges. The height of the walls $h'$ slightly exceeds the thickness of the plate F, and the cover $h^3$ is provided with inwardly-turned edges adapted to fit over the side walls $h'$, so as to effectually exclude the light. The cover $h^3$ is hinged to the back plate $h$ at one side, which may be called the "bottom" of the holder, as indicated at $h^2$.

A shallow pocket is formed at two opposite sides of the holder by extending across its front a plate $h^4$ at one side and a plate $h^7$ at the other. Within the pocket formed by the plate $h^4$ a bow-spring $h^5$ is placed, being secured by having its ends caught under pins $h^6$ $h^6$, set between the plate $h^4$ and the back $h$, the middle of the bow curving upwardly. The plate is held in the holder by being inserted within this pocket against the resistance of the spring, and having its opposite edge caught under the plate $h^7$. An aperture $h^{10}$, formed in the plate $h^7$, admits the finger-nail of the operator to remove the plate.

Vertical ways are formed, one at each end of the partition E, by turning its edges forwardly and inwardly and are adapted to receive the side flanges of the plate-holder H, formed by the projecting edges of its back $h$. A shaft or spindle K is journaled across the interior of the camera-case immediately forward and at the bottom of the partition E, its bearings being formed in the side walls of the case. A crank-arm M is secured to the shaft K, preferably approximately midway of its length, and is of sufficient length to reach approximately to the top of the plate-holder when secured against the partition E. At the outer end of the crank-arm M there is a fixed cross-bar $m$, the length of which is slightly greater than the width of the plate-holder, the ends of this bar $m$ being folded inwardly—that is, toward the partition E—when the crank-arm M is in its elevated position. The front $h^3$ of the plate-holder is provided with lateral wings $h^8$ $h^8$ near its outer end, and the hooks formed by the inturned ends of the bar $m$ are adapted to engage these wings. The shaft K is provided with a crank-arm $k$ at one of its ends, which sweeps over the interior surface of the wall $a$ of the case and which carries a crank-pin $k'$, projecting through a segmental slot $k^2$ in the wall $a$ of the case and which is provided at its outer end with a button $k^3$. The crank-arm $k$ is covered by a shield O, secured to the inner surface of the wall $a$, so as to prevent the admission of light through the slot $k^2$.

The crank-arm M is raised to a vertical position by means of the crank-arm $k$ before the plate-holder is inserted in front of the partition E. As the flanges of the plate-holder enter the ways $f$ the wings $h^8$ of the cover $h^3$ will enter the hooked ends of the cross-arm $m$, and the plate-holder is opened by throwing down the crank-arm M, which is rigid. The end of the crank-arm M comes into contact with the partition $d$ below the lens D, so that the plate F is fully exposed to the action of the light entering through the lens. The plate-holder is closed by raising the crank-arm M and is locked by friction, the upper side wall being formed with a slight elevation or boss, as shown at $h^9$. When the plate-holder is closed, the cover $b$ of the camera-case may be safely opened and the plate-holder withdrawn and restored to its proper place in the magazine, another plate-holder being inserted in front of the partition E. The side walls of the magazine are lined with vertically-grooved blocks G, the edges of the plate-holders sliding freely within these grooves. These blocks extend forward of the partition E and are grooved to receive and support it, as plainly shown in Fig. 7. I find a convenient size of portable camera to provide a magazine capable of holding eleven plate-holders, so that with the one in position before the partition one dozen plates may be carried.

The shutter consists of two segmental plates P $p$, pivoted to the inner face of the front A of the camera by a pin $p'$, common to both, and in such position that they cross the aperture C, the former plate being loose and the latter plate being fixed upon the pivot-pin. The plate P lies between the plate $p$ and the front wall A and is provided with an aperture $c$, adapted to register with the aperture C, and being elongated through an arc of greater length than the diameter of the aperture C. A spring Q, secured to the case and attached to the plate $p$, tends to hold the two plates in a withdrawn position, so that the aperture C is covered by the solid portion of the plate P. The latter plate is moved by means of the plate $p$, which engages lugs R $r$, projecting from the surface of the plate P, the former at its lower or rearward edge and the latter at or beyond the forward end of the aperture $c$. The width of the plate $p$ is such that when in contact with the lug R it does not cover the aperture $c$. Stop-pins S $s$ are set in the inner face of the front A to limit the range of movement of the plate P. The pin $p'$ projects through the front wall A of the camera and carries a thumb-piece T, by means of which it may be turned to move the plate $p$. A spring friction-arm U, secured to the inner face of the front wall A, as shown at $u$, bears upon the plate P with sufficient force to hold it in any position in which it may be placed against the resistance of the spring Q. A push-button V projects through the front wall A and bears upon the spring U, so that it may be raised from the plate P.

When the shutter is in its withdrawn position, being in contact with the stop S, the aperture C is closed by the solid portion of the plate P beyond its aperture $c$. As the plate $p$ is moved it covers the aperture $c$ before it contacts with the lug $r$, and hence before the plate P is moved. When the shutter is in its most advanced position, contacting with the stop $s$, the aperture C is closed by the solid portion of the plate P back of the aperture $c$, and the plate $p$ may be allowed to recede under the strain of the spring Q until it meets the lug R and is stopped. The button T being now pressed the frictional hold of the spring U upon the plate P is broken and the shutter is instantly drawn back by the spring Q, the aperture $c$ uncovering the aperture C in passing. A time exposure is accomplished by moving the plate P to the position shown in Fig. 2, so that the aperture $c$ registers with the aperture C, and allowing the plate $p$ to recede to uncover the aperture $c$, the exposure being prolonged at the pleasure of the operator.

A "finder" is shown at W, and, being of ordinary construction, need not be described.

A strap-handle X is secured to the side $a$ of the case, and in order that it may not interfere with the crank-knob $k^3$ it is set diagonally across the side.

It will be seen that by the use of the plate-holder described the user may purchase plates inclosed each in a holder. The camera may be loaded in the light and freely opened for shifting the plates. An extra supply of plates and holders may be carried and the camera recharged without resort to a dark room. The plates are carried to the dark room for developing in the original holder, from which there has been no occasion to remove them up to this step in the process of making the picture. The holder being in no wise injured by use may be returned to the dealer in exchange for a new one containing a new plate.

I have not attempted to show or describe other forms of construction by which a light-proof plate-holder may be, while within the camera-case, opened and closed by mechanism controllable from without the case; but I believe myself to be the first to accomplish this result, and that any means for doing it comes within the scope of my invention.

If desired, the partition E may be omitted, the flanges of the holder directly entering the grooves in the blocks G G when the holder is placed in position for the exposure of the plate.

I claim as my invention—

1. The combination with a camera having a lateral opening, a door for said opening, means for securing a plate-holder in the focal plane of the camera, and means comprising lugs or flanges adapted to bear against both faces of the plate-holder at approximately the points where pressure is applied in opening and closing the cover of said plate-holder, and means controllable from without the camera for operating said cover, substantially as described.

2. In a magazine-camera the combination with an oblong case having a lens at one end, a transverse rigid partition immediately back of the focal plane and forming a seat for a plate-holder, and a storage-chamber back of the partition, of a light-proof plate-holder having a hinged side and adapted to fit against the plate-holder seat, means for securing the plate-holder to its seat, and means controllable from without the case for oscillating the hinged side of the holder while so held to its seat.

3. In a photographic camera, the combination with a case, a plate-holder having a hinged cover, such cover being adapted to be mechanically engaged by an opening device, and means for securely holding the body of the holder within the case, of a rock-shaft pivoted within the case parallel with the hinged edge of the holder-cover, a crank-arm carried by the shaft, a cross-arm fixed to the crank-arm and having its ends adapted to engage the holder-cover, and means exterior to the case for controlling the rock-shaft, substantially as described and for the purpose specified.

In testimony whereof I affix my signature in presence of two witnesses.

JOHN A. MOSHER.

Witnesses:
 LOUIS K. GILLSON,
 ISABEL A. HELMICH.